June 18, 1935.　　　　E. H. SPIEGL　　　　2,005,442
CONVEYER
Filed May 8, 1933　　　3 Sheets-Sheet 1
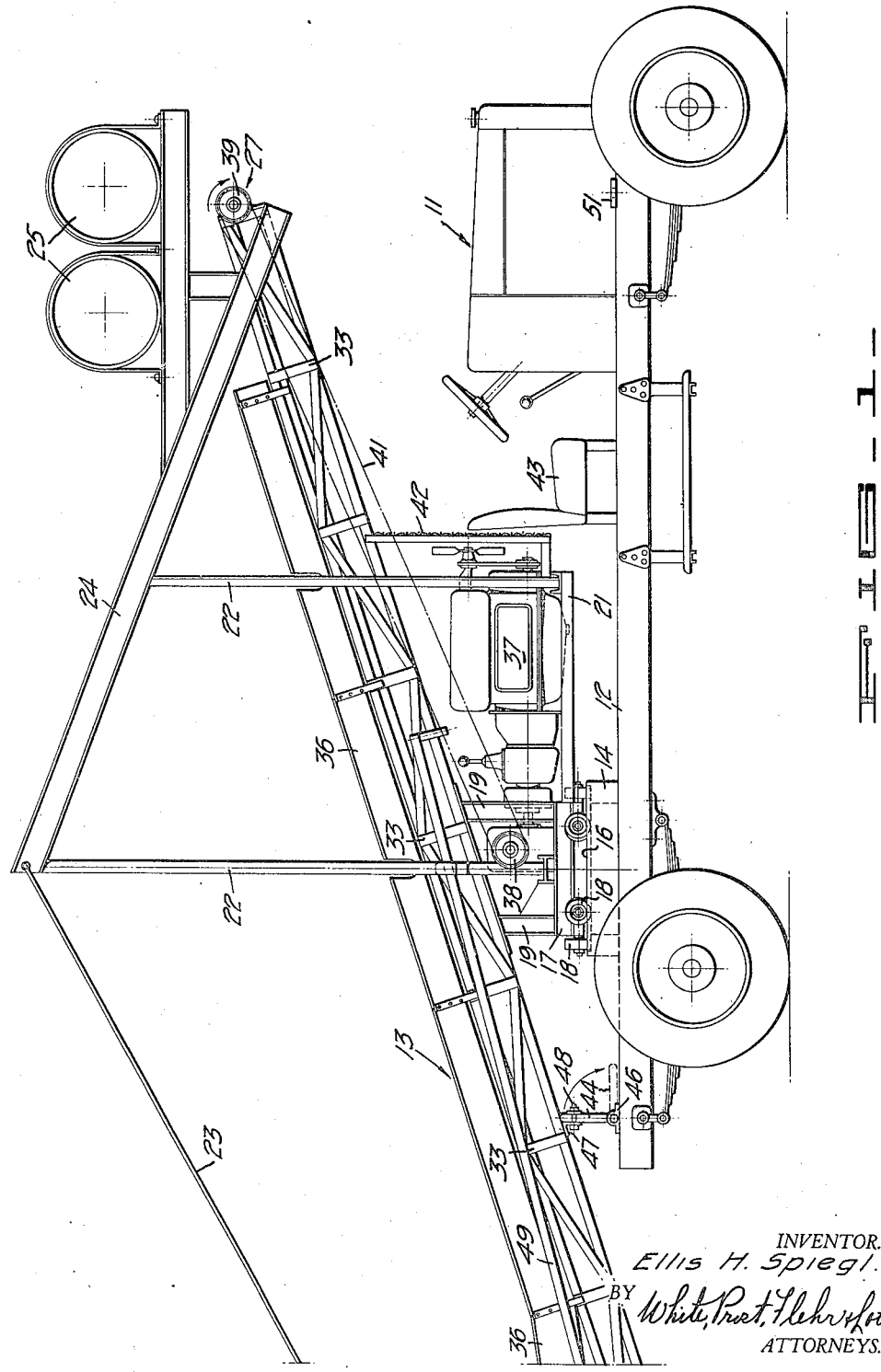
INVENTOR.
Ellis H. Spiegl.
BY White, Prost, Flehr & Lothrop
ATTORNEYS.

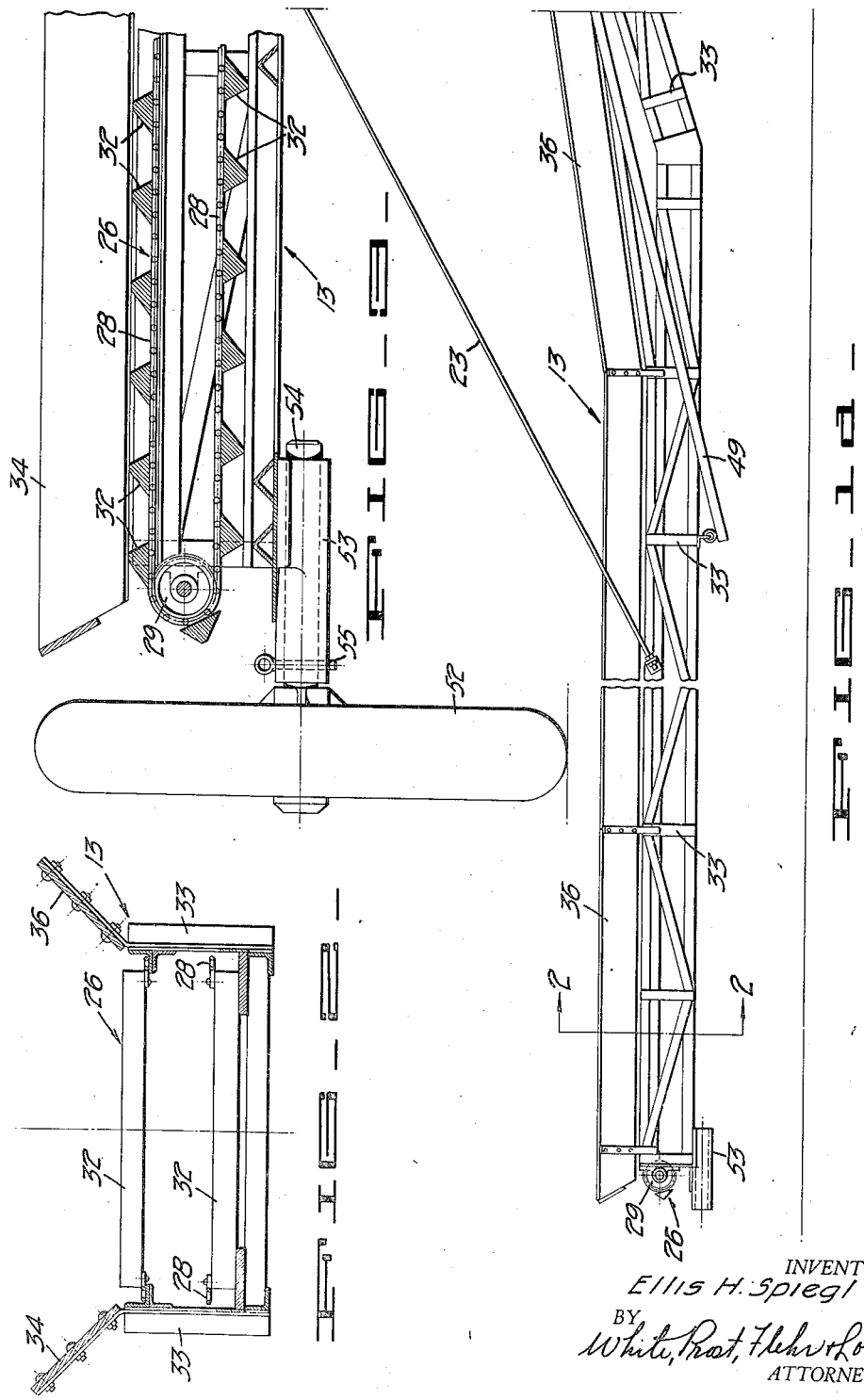

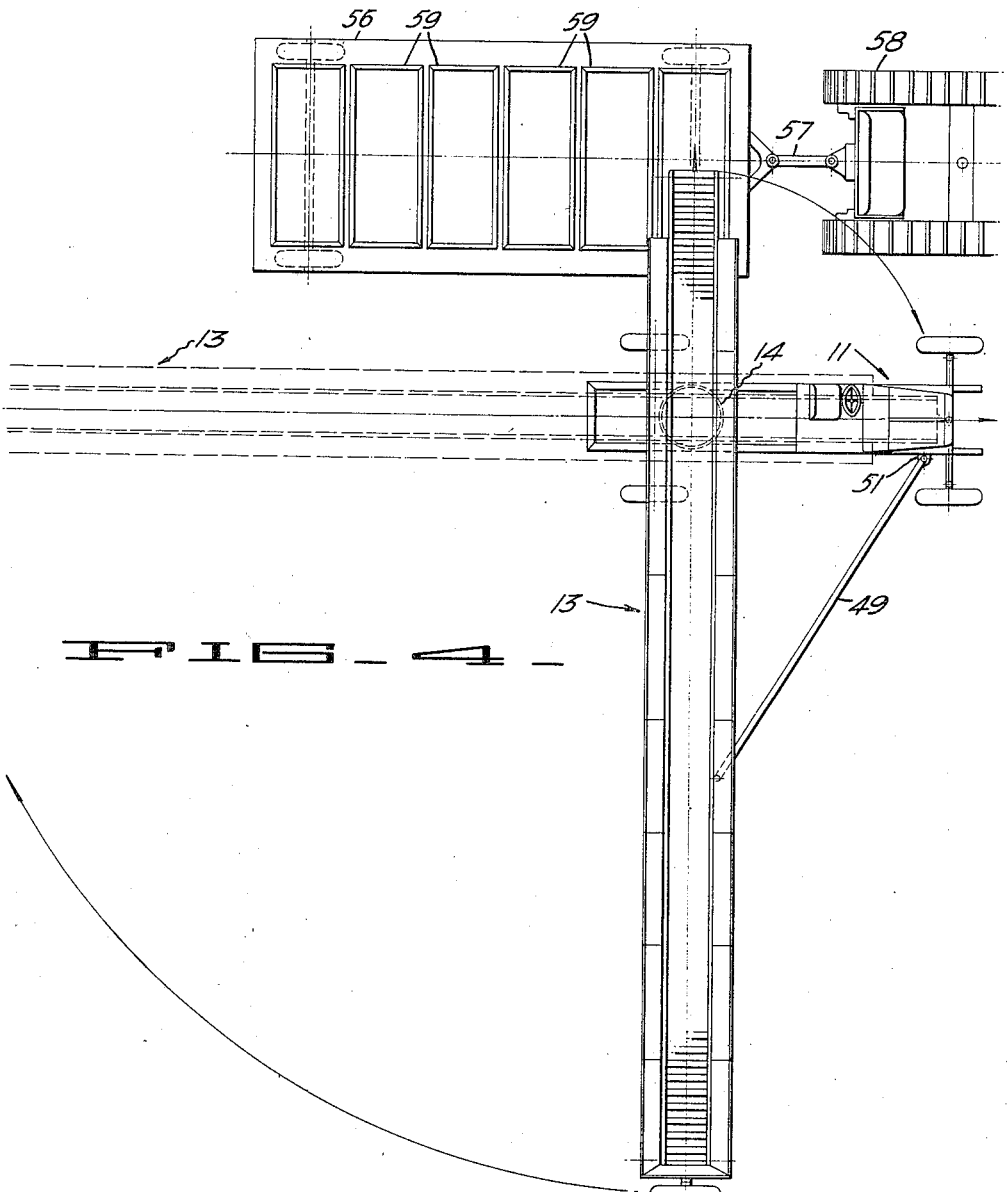

Patented June 18, 1935

2,005,442

UNITED STATES PATENT OFFICE 2,005,442

CONVEYER

Ellis H. Spiegl, Salinas, Calif.

Application May 8, 1933, Serial No. 669,873

2 Claims. (Cl. 198—233)

The invention, in general, relates to modes of and devices for harvesting crops such as lettuce, beets, cauliflower and the like. More particularly, the invention relates to a system of gathering crops of the character aforementioned by which the crops are gathered with a minimum of field operations.

This application is a continuation in part of my co-pending application, Serial No. 653,222, filed January 24, 1933, and entitled "Gathering apparatus and method", and the system hereinafter described is but a part of my novel system of handling produce in the field and in the processing sheds for preparation for marketing. That part of my system for handling produce, such as lettuce, in the processing sheds is disclosed in my co-pending application Serial No. 655,231, filed February 4, 1933, now Patent No. 1,983,052, patented December 4, 1934, and entitled "System of handling produce such as lettuce".

The system of gathering field crops, which constitutes the subject-matter of the present application, is applicable to a variety of crops, such as beets, cauliflower, potatoes, lettuce and the like. The equipment which is employed in the system hereinafter described has been designed and is especially suitable for harvesting lettuce, and, accordingly, reference will be made throughout the specification to the handling of such produce.

To those skilled in the art of gathering lettuce in the field, it is well known that heretofore considerable time and effort and the employment of large forces of workmen have been normally required to harvest the average lettuce crop. Moreover, the gathering of the crop has involved the handling and rehandling of large numbers of relatively small crates. The conventional mode of harvesting lettuce heretofore has been carried on by depositing standard, relatively small field crates in the depressions between the lettuce mounds at intervals throughout the entire field. Workmen, designated cutters, traverse the field, sever the lettuce from the soil, and deposit the heads in the aforementioned depressions. A crew of packers follows the cutters and packs the severed lettuce into the aforementioned crates. A crew of loaders, in turn, follows the packers and loads the packed crates upon trucks for hauling to a central plant.

As a direct consequence of a large number of factors arising out of the present method of gathering lettuce, as hereinabove described, considerable damage invariably results to the crop. It is customary, for example, to utilize conventional trucks for conveying empty field crates about the field for deposition therein at desired intervals. Due to the lay-out of the standard lettuce field, a pair of wheels on one side of the standard truck may travel in the depressions between the lettuce mounds but the pair of wheels on the opposite side of the truck necessarily rides upon the lettuce mounds to the consequent ruin of many lettuce heads. Further, in unloading the crates from the truck, the crates are dumped more or less promiscuously and frequently fall with great force upon the growing crop. In addition, it is the custom of the field packers to pack the crates above capacity and to stack the overfilled crates upon the mounds of lettuce for the convenience of the loading crew. It is apparent that herein resides an additional factor of damage to the lettuce heads. Moreover, in the present practice of gathering the crop, considerable young heads are stepped upon by workmen and the damage in this regard is high because normally a relatively large force of men is employed in harvesting the crop.

It is a primary object of my invention to provide a system of gathering lettuce and the like which obviates the handling and rehandling of large numbers of relatively small field crates and effects a gathering of the crops in a minimum of time and with a minimum of labor.

A further object of my invention is to provide a system of this character which affords rapid and easy handling of the crops without damage thereto.

A still further object of my invention is to provide apparatus, adaptable to my novel system, which is inexpensive to manufacture and maintain and which can be operated economically.

Other objects of the invention, together with some of the advantageous features thereof, will appear from the following description of the preferred features and embodiments of the invention.

In the drawings:

Figures 1 and 1—A, taken together, show a side elevation of the preferred embodiment of one of the elements of my invention.

Figure 2 is a view of the embodiment of the invention illustrated in Figure 1 and taken on the section line 2—2 thereof.

Figure 3 is an enlarged detail, partly in cross-section, of a portion of the embodiment illustrated in Figures 1, 1—A and 2.

Figure 4 is a diagrammatic plan of the embodiment of my invention illustrated in one operative position in the field.

The system of my invention for gathering field crops preferably comprises advancing a first vehicle having a moving conveyer thereon over a field of the crops, depositing severed crops on said conveyer during the progress of the vehicle, and simultaneously advancing a second vehicle having a container thereon over the field adjacent to the discharge end of the conveyer to receive crops discharged therefrom.

As illustrated in Figures 1 and 1—A, I provide a first vehicle 11 having a platform 12 thereon, which vehicle can be either a power-driven truck, as shown, or, if desired, any suitable carriage or trailer having a platform and adapted to be drawn by power or other means. While the conventional type of motor truck can be utilized with this system of my invention, I prefer to employ a motor truck having a tread of sufficient width to span the mounds of lettuce so as to travel in the rows or depressions between them.

In accordance with the invention, I rotatably mount a conveyer unit, generally designated by the reference numeral 13, upon the platform 12 of the vehicle 11. Any suitable means can be utilized for rotatably mounting the conveyer unit, but in the embodiment illustrated I have provided for this purpose a turntable 14 having a runway 16 upon which is mounted a truck 17 carrying rollers 18 which ride upon the runway 16. As illustrated, the turntable is mounted upon the platform of the vehicle, and the conveyer unit, which includes the conveyer and its supporting framework, as well as means for driving the conveyer, is supported by means of uprights 19 and lateral arms 21 rigidly secured to and extending from the truck 17. In order properly to balance the conveyer about the turntable 14, I provide a truss, generally designated by the reference numeral 22, which is supported partially by the truck 17 and partially by the laterally extending arms 21 and which includes guy wires 23 and cross beams 24 secured at suitable points to the framework of the conveyer. Moreover, as an additional means for balancing the conveyer unit about the turntable 14, I provide ballast means 25 which can take the form of tanks or any other mass as desired. The ballast 25 conveniently can be supported by the truss 22, as illustrated in Figure 1.

The conveyer unit of the apparatus preferably includes a conveyer 26 of the chain type, having a discharge end 27 and comprising a pair of spaced chains 28 which are trained about pairs of sprockets 29. The type of conveyer 26 which I preferably employ and which has proven efficacious includes a plurality of transverse bars 32 which are arranged at relatively short intervals throughout the extent of the conveyer chains and rigidly secured thereto. Produce which is tossed or deposited upon the conveyer comes to rest between the transverse bars 32 and, upon movement of the conveyer, is carried thereby from its deposited position to the discharge end 27 of the conveyer. It is to be understood, however, that a belt and suitable rollers therefor, rather than chains and sprockets, can be utilized as a conveyer, if desired. The conveyer 26 is housed in a framework having side beams 33 and outwardly flaring extension pieces 34 and 36, see Fig. 2 of the drawings, the latter pieces extending above the conveyer to provide, in effect, a trough for the conveyed produce so that spilling of the produce is avoided except at the discharge end of the conveyer.

The conveyer unit also includes means for driving the conveyer and, while the conveyer may be driven from the power unit of the vehicle by means of suitable shafts and gearing, I have found it advantageous to utilize an independent prime mover, such as a gas engine 37, for effecting this purpose. The engine 37 conveniently is rigidly mounted upon the laterally extending arms 21 of the truck 17 and is placed in driving connection with the conveyer by suitable shafting and gears as well as by a chain drive including the sprockets 38 and 39 and the chain 41. A screen or other wall 42 can be mounted between the engine 37 and the driver's seat 43 of the vehicle to avoid possibility of injury to the operator upon operation of the engine 37.

The vehicle 11, together with its supported conveyer unit, is adapted to travel over roads and highways as well as over fields of crops. When travelling over public roads the conveyer unit is carried in the position shown in Figures 1 and 1—A, with the conveyer 26 and its framework trailing from the vehicle. The conveyer unit can be locked in the trailing position and against rotation about the turntable 14, by any suitable locking means. In the embodiment illustrated, I have provided locking means which includes a crank 44 which is journaled in bearings 46 mounted on the platform 12 of the vehicle, angles 47 which are secured at opposite sides to the lower surface of the conveyer framework, and screw bolts 48 for fastening the crank 44 to the angles 47 and thereby securing the conveyer unit to the vehicle platform and against rotation or relative movement with respect thereto. Upon a release of the bolts 48, the crank 44 can be rotated in its bearings and laid upon the platform of the vehicle. The conveyer unit thus is free to turn and can be readily manually moved in either direction by means of the turntable 14.

Upon traversing a field of crops, the conveyer 26 is carried in a laterally extending position with respect to the vehicle 11. Inasmuch as the conveyer unit is adapted to be rotated in either direction about the turntable 14, it is apparent that the conveyer can be carried at either side of the vehicle. This feature enables the gathering of the crops at the extremities of the field without difficulty and in the same manner as at all other points of the field. In order to lock the conveyer unit with the conveyer 26 extending laterally from the vehicle 11, as when travelling over a field of crops, I have provided a bar 49 which is pivotally fastened to the framework of the conveyer and which can be connected to the vehicle 11 as illustrated in Figure 1—A. For example, the bar 49 can be provided at its one end with a depending tongue which can be inserted in an aperture formed in an ear 51 provided on the vehicle 11. When not in use the bars 49 conveniently can be supported by the framework of the conveyer 26, a hook being provided therefor upon the framework.

In Figure 4 I have illustrated, in diagrammatic plan, the position assumed by the conveyer unit when the vehicle 11 is driven over the field of crops for gathering the same. The field position of the conveyer is illustrated in full lines and the road position of the conveyer unit is shown in dotted lines. When in use in the field the extended extremity of the conveyer preferably is provided with a wheel 52, as illustrated in Figures 3 and 4. The wheel 52 is detachably mounted to the framework of the conveyer by means of a sleeve 53 which is secured to the lower part of the conveyer framework, together with a stub shaft 54 upon which the wheel is journaled and a cotter pin 55 which pierces the sleeve and shaft. When the vehicle, together with its supported conveyer unit, is being driven or drawn along public roads, the wheel 52 can readily be removed from the framework of the conveyer and carried on the vehicle.

As I have hereinabove stated, the present equipment has been especially designed for use in harvesting lettuce. In the embodiment illustrated I have constructed the conveyer 26 and its supporting framework so that the major portion thereof is carried relatively close to the ground in order that workmen in the field can readily and easily deposit severed lettuce upon the conveyer. Moreover, the conveyer is formed to such a length in this embodiment that it extends from the vehicle over nine mounds of lettuce. This length, however, is not critical, as it is obvious that a conveyer of shorter or greater length can be utilized, if desired, without departing from the scope of the invention. Further, and for purposes hereinafter stated, the conveyer and its supporting framework are inclined so as to extend upwardly over the vehicle 11 with the discharge end 27 relatively far from the ground.

The hereinabove described apparatus, including the vehicle 11 and its supported conveyer units, can aptly be termed a "loading apparatus". The system of my invention for gathering field crops also provides for the use of a second vehicle 56 which is used in conjunction with the loading apparatus in harvesting crops. The vehicle 56 can be either a truck or other vehicle, such as a trailer. In the drawings I have shown the vehicle 56 as a trailer having a tread of sufficient width that the trailer travels in the depressions between the lettuce mounds and which is provided with draft means 57 for attachment to a tractor 58 or other drawing means. The vehicle 56 removably carries a plurality of relatively large containers 59, and I preferably employ containers of the character described in my co-pending application, Serial No. 653,222, filed January 24, 1933, and entitled "Gathering apparatus and method". These containers 59 have a capacity equivalent to approximately fifteen to eighteen of the present type of standard field lettuce crates.

In Figure 4 of the drawings I have illustrated one position of the vehicle 56 with respect to the loading apparatus in the field. In practising the system of my invention, the vehicle 11 with its supported, extended conveyer 26, and the vehicle 56 carrying containers 59 are aligned in substantially parallel relationship, with the vehicle 56 positioned so that one of the containers 59 thereon is adjacent the discharge end 27 of the conveyer. As the two vehicles progress over the field of crops, with the conveyer 26 in motion, workmen called "loaders" operate behind the extended conveyer 26, sever the crops from the soil, and deposit the same upon the conveyer. The crops are carried by the conveyer from a position adjacent to the soil, over the vehicle 11, and dropped from the discharge end 27 of the conveyer 26 into a container 59. As one container 59 becomes filled during the progress of the vehicles over the field, the relative positions of the vehicles 11 and 56 are adjusted to align a second container 59 with the discharge end of the conveyer. These adjustments between the relative positions of the two vehicles are repeated from time to time until all of the containers 59 are filled, and the cycle is then repeated until the entire field has been traversed. It is apparent that any number of vehicles 56 can be employed in the system, so that, upon receiving a load of crops from the field with one of the vehicles, a second vehicle 56 with empty containers 59 thereon can replace the first vehicle while the latter is being moved to a central plant, and a third or additional vehicles can be approaching the field for receiving the crops from the conveyer. The vehicles with the loaded containers are moved to a central processing shed where the containers are removed from the vehicle and placed upon rollers leading to a dumping apparatus from which the produce passes to work conveyers, all as described in my co-pending application Serial No. 655,231, filed February 4, 1933, now Patent No. 1,983,052, patented December 4, 1934, and entitled "System of handling produce such as lettuce".

My improved system of gathering field crops overcomes the many disadvantageous features which exist in the present practice and which result in considerable damage to the crop. For example, the provision of vehicles having sufficient width of tread affords traversing the field without damage to the crop by the ground engaging members of the vehicle. In addition, as my novel system obviates the use of the relatively small crates in the field, the aforementioned factors of damage to the crop arising out of the present use of the small crates are eliminated. Further, the hereinabove described system affords a gathering of the crop with a relatively small force of men. This feature removes to a great extent damage to the crop by stepping thereon. Moreover, closer supervision of the workmen is afforded and as a consequence young or immature heads of lettuce or other crop are not severed indiscriminately by the workmen as in the past but are left in the field to mature and are gathered in a subsequent traverse of the field.

While I have illustrated the preferred construction of my loading apparatus, it is to be understood that I am not to be limited to the embodiment shown, as that portion of my invention, as defined in the appended claims, can be embodied in a plurality and variety of forms.

I claim:

1. A crop gathering apparatus comprising a vehicle adapted to advance over a field, a continuous supporting framework having a first portion inclined to the horizontal and transversely spanning said vehicle to project beyond both sides thereof and a second portion substantially horizontal and extending from the lower terminus of said first portion for a sufficient distance to accommodate a plurality of side-by-side loaders, a conveyer belt the upper and lower runs of which are substantially coextensive with said framework, said upper run having a horizontal stretch on said horizontal portion and an inclined stretch on said inclined portion, and means forming an enclosing wall around said upper run except at the discharge end thereof.

2. A crop gathering apparatus comprising a vehicle adapted to advance over a field, a conveyer belt having upper and lower runs, the upper run of said belt having a first portion inclined to the horizontal and transversely spanning said vehicle and a second portion substantially horizontal and extending from the lower terminus of said first portion for a sufficient distance to accommodate a plurality of side-by-side loaders, a supporting framework for said conveyer disposed generally below said upper run of said belt and having an inclined portion spanning said vehicle and a generally horizontal portion extending from the lower terminus of said inclined portion, said portions being relatively rigid, and means for supporting said framework at approximately waist-height above the ground.

ELLIS H. SPIEGL.